June 30, 1959 W. H. RUSSELL, JR 2,892,387
INTERNAL CUTTING DEVICE
Filed July 29, 1954
2 Sheets—Sheet 2

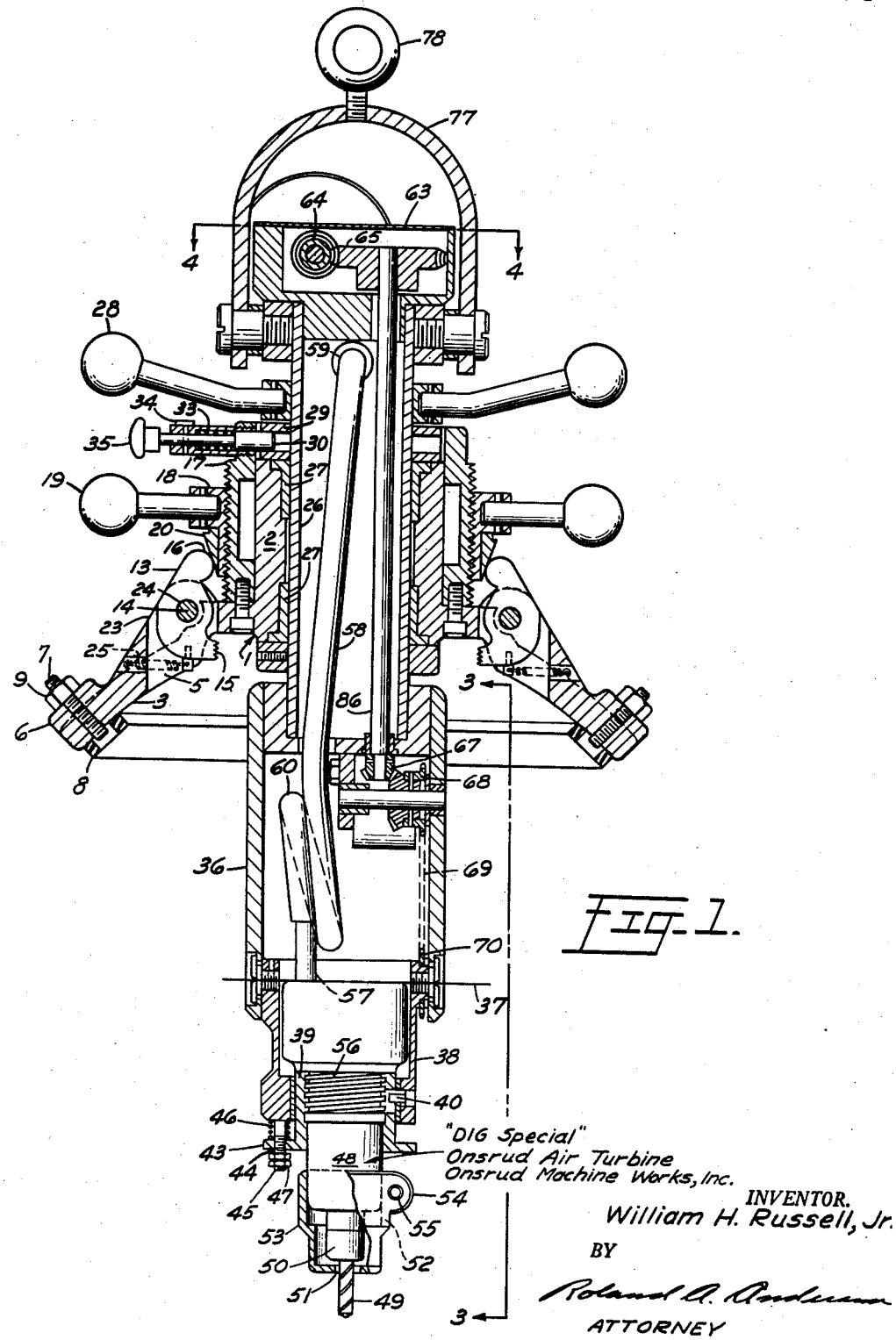

INVENTOR.
William H. Russell, Jr.
BY
ATTORNEY

United States Patent Office 2,892,387
Patented June 30, 1959

2,892,387

INTERNAL CUTTING DEVICE

William H. Russell, Jr., Tullahoma, Tenn., assignor to the United States of America as represented by the United States Atomic Energy Commission Application July 29, 1954, Serial No. 446,691

3 Claims. (Cl. 90—12)

This invention relates generally to a device adapted to remove material from the interior of a hollow workpiece or otherwise to operate on an internal surface thereof. More particularly, the invention relates to a device for forming a true spherical internal surface in a workpiece or for cutting radial slots of an adjustable constant depth in an already established spherical internal surface.

According to the principles of the present invention, a main generally cylindrical hollow body structure is provided with gripping means whereby it can be fixedly attached to a hollow workpiece, above, and in axial alignment, with an opening in the top of the workpiece. An elongated generally cylindrical hollow housing is rotatably supported by and within the main body structure for manual rotation about a vertical axis, the housing extending through, and in axial alignment with, the opening in the workpiece. Pivotally attached to the lower extremity of the housing, for rotation about a horizontal axis, is a carrier element which carries an air driven turbine motor, to the rotor of which the cutting tool is attached by the usual chuck. The motor is adapted to move axially with respect to the carrier element, and a spring is provided to continually urge the motor and tool downwardly against the workpiece. A stop is also provided to limit the maximum downward movement of the motor and tool. Surrounding the motor and tool is an axially adjustable cylindrical member through a hole in the bottom of which the tool protrudes by a manually adjustable amount, whereby the depth of cut may be precisely adjusted. The angular position of the tool about a vertical axis may be adjusted, as desired, by manual rotation of the entire housing, a handle being provided on the external portion of the housing for this purpose. The angular position of the tool about a horizontal axis may be adjusted, as desired, by manual pivoting of the carrier element, the drive mechanism for this purpose being carried by the housing and terminating in a manually rotatable handwheel at the top of the housing. An important aspect of the invention involves the provision of a seal between the workpiece and the cutting device and suction means for carrying away particles of removed material.

Accordingly, an object of the invention is to provide a device for cutting holes or slots of a precise and predetermined depth in a workpiece.

Another object of the invention is to provide a spring loaded cutting tool wherein the entire force urging the tool against the workpiece is derived from the spring.

A more general object of the invention is to provide a device adapted to remove material from the interior of a hollow workpiece or otherwise operate on an internal surface of a workpiece.

Another general object of the invention is to provide a device adapted to form true spherical internal surfaces in a hollow workpiece.

Another object is to provide a device, as in the preceding object, having provision for manual angular adjustment of the cutting tool about two mutually perpendicular axes.

Still another object is to provide a device, as in the preceding object, having provisions for sealing off the cutting operations from the atmosphere and removing the dust and particles as they are formed.

These and other objects of the invention will become more apparent from the following description of one embodiment of the invention when read in connection with the accompanying drawings, wherein, Fig. 1 is a sectional view of an internal cutting device constructed in accordance with the principles of the present invention, this view being taken through a vertical mid-plane of the device;

Figure 4:
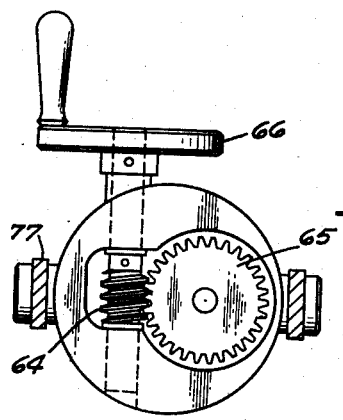
Fig. 4 is a horizontal sectional view taken along lines 4—4 of Fig. 1.

Referring now to the drawings, it will be understood that the particular embodiment of the invention illustrated is especially intended to operate on the internal surface of a hollow spherical workpiece which is provided at its top with a protruding neck adapted to be gripped by the gripping means of the cutting device to firmly secure the cutting device to the workpiece. Reference numeral 1 designates a generally cylindrical hollow main body structure which sits on top of the workpiece in axial alignment with the neck thereof. Main body structure 1 may best be thought of as consisting of an upper upstanding cylindrical portion 2 and a lower umbrella-like portion 3 which extends outwardly and downwardly.

Figure 2:
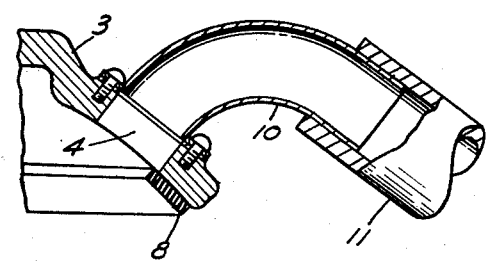
Fig. 2 is a fragmentary section of a detail of the device shown in Fig. 1, this view being taken through a different vertical mid-plane from that of Fig. 1.

This umbrella-like lower portion 3 is entirely solid, for reasons hereinafter to be explained, except for the single opening 4 (shown in Fig. 2) and the four narrow slots 5, two of which are shown in Fig. 1. At four equally spaced points around the periphery of the lower portion 3 of the main body structure 1, the structure is enlarged to form four bosses 6. Each boss 6 has a tapped hole through which a bolt 7 is adjustably threaded, a nut 9 being provided to lock each bolt 7 in any desired position. When the entire device is initially placed upon the workpiece, the protruding inner ends of these four bolts 7 contact four equally spaced points on the external spherical surface of the workpiece and thereby support the device from the workpiece. At such time, the bolts 7 may be suitably individually adjusted so as to secure exact alignment between the workpiece and the cutting device prior to activating the workpiece gripping mechanism.

Attached to the lower surface of the lower portion 3 is a circular gasket or pad 8 of readily compressible resilient material, such as soft rubber, which forms a seal between the lower portion 3 and the workpiece, gasket 8 being provided with four appropriately positioned holes to accommodate bolts 7. By reason of this seal, and the construction of the remainder of the cutting device, the entire device forms, in effect, a more or less airtight cover over the workpiece, thereby tending to isolate the cutting operations from the surrounding atmosphere. In operation, suction is continuously applied to the confined space formed beneath the cover by way of a flexible conduit 11, adapted to be connected to a source of vacuum (not shown) at one end, and at its other end to a pipe 10 communicating with the aforesaid opening 4 (see Fig. 2). In this way, dust and particles released in the cutting operation are continuously removed from the vicinity of the cutting operation and withdrawn along conduit 11.

The four narrow slots 5, previously referred to, are provided for the accommodation of four pivoted gripping elements 13 which are rotatable within the respective slots 5 about respective horizontal axes 14. Each gripping element 13 is provided with a lower inwardly facing serrated gripping surface 15 and an upper inwardly facing rounded cam surface 16. The upstanding cylindrical portion 2 of the main body structure 1 is externally threaded, as at 17, and a large nut 18 is threaded thereon. Nut 18 is provided with a plurality of outwardly protruding knobs or handles 19 to facilitate manual rotation of the nut. Near its bottom, the nut 18 is shaped to form an outwardly facing inclined annular cam surface 20 which cooperates with the rounded cam surfaces 16 of gripping elements 13. In the operation of the gripping mechanism, after the cutting device has been accurately aligned by suitable adjustment of bolts 7 as previously described, the operator, by means of handles 19, rotates the nut 18 so as to cause it to travel downwardly, whereby the coaction of cam surfaces 20, 16 forces all four gripping elements 13 to pivot in such a direction that their gripping surfaces 15 are forced inwardly and firmly grasp the external surface of the neck of the workpiece.

At opposite sides circumferentially of each of the four narrow slots 5, the lower portion 3 of the main body structure 1 is provided with a pair of upstanding spaced ears 23. A horizontal pin 24 is carried by and between ears 23, and it is on this pin 24 that the gripping element 13 is pivotally supported. A tension spring 25 is attached at its outer end to the lower portion 3 of the main body structure 1, and, at its inner end, to the gripping element 13, so as to continuously urge the cam surfaces 16, 20 together. The purpose of springs 25 is to maintain the gripping surfaces 15 in their outer positions, away from the workpiece, except when they are deliberately forced inwardly by appropriate manual manipulation of handles 19.

A generally cylindrical housing 26 is rotatably supported, as by bearings 27, within the main body structure 1 for rotation about a vertical axis with respect to the body structure and the workpiece. Attached to and protruding outwardly from housing 26 are handles 28 for manual control of its angular position. A plurality of receiving cups 29 are provided at equally spaced points around the external surface of housing 26, these cups being adapted to receive an index bar 30 slidably carried by the upper portion 2 of the main body structure 1. The index bar 30 is spring loaded, as by compression spring 33, which spring urges the bar radially inward into engagement with one of the cups 29. Bar 30 is provided with a button 35 at its outer end to facilitate its manual manipulation. Bar 30 is also provided with a slot and pin arrangement 34 by means of which the bar can be locked either in its radially inward position, as shown, to thereby lock the housing 26 in a desired angular position relative to the body structure 1, or in its radially outward position, wherein the housing 26 is freely rotatable with respect to the body structure 1.

At its lower end, housing 26 terminates in a pair of horizontally spaced downwardly extending legs 36. Pivotally supported by and between the lower ends of legs 36, for rotation about a horizontal axis 37, is a hollow generally cylindrical motor carrier element 38. An internally threaded sleeve 39 is slidably supported by carrier element 38 for linear movement axially of the carrier element, that is, in a vertical direction in the drawings. A pin and vertical slot arrangement, indicated at 40, prevents relative rotation as between carrier element 38 and sleeve 39, while permitting the linear axial movement previously referred to. An annular collar 43, which forms the lower end of sleeve 39, is provided with a plurality of angularly spaced holes 44 near its periphery, through each of which extends a bolt 45 fixedly attached to carrier element 38. Thus, the sleeve 39 is adapted to ride up and down along bolts 45. A plurality of compression springs 46 are interposed between collar 43 and carrier element 38, whereby the sleeve 39 is continuously urged to its maximum downward position. Nuts 47 are threaded on the bottom of the bolts 45 to form stops which limit the maximum downward movement of sleeve 39 relative to the carrier element 38. It will be apparent that the maximum downward position of sleeve 39 may be adjusted, as desired, by appropriate positioning of nuts 47.

The cutting tool 49 is driven by a conventional air turbine motor 48 of any suitable type, such as the Model "D1G Special" Onsrud Air Turbine, manufactured by the Onsrud Machine Works, Inc., of Chicago, Illinois. Motor 48 is provided with the usual chuck arrangement 50 for attaching the cutting tool 49 to its rotor, and its outer casing is provided with a screw threaded portion, as indicated at 56, adapted to be screwed into the previously mentioned internal screw threaded portion of sleeve 39 to securely fasten together the sleeve 39 and the motor 48.

Surrounding the tool 49 and the lower portion of motor 48 is a cylindrical member 53 which is open at its top so that it may be slid over the motor casing. At its bottom, member 53 is closed except for a hole 51 through which the tool 49 protrudes. Member 53 is slotted, as at 52, along one side of its upper portion, and it is provided with a pair of lugs 54 and associated bolt 55 whereby the member 53 can be tightened against the motor casing and thereby retained at any desired position axially of the motor 48 and tool 49. The extent to which the tool 49 protrudes below the bottom surface of member 53 is thus adjustable by the operator, as desired.

Motor 48 is also provided at its upper end with an air inlet nipple 57 to which is attached a flexible air hose 58 which travels upwardly through the hollow interior of housing 26 and is brought out of the device laterally through a hole near the top of housing 26, as indicated at 59. It will be understood that air hose 58 is connected at its remote end to a source of air pressure (not shown) suitable for operating the air turbine motor 48. The air hose 58 is provided with a loop, as indicated at 60, in order to provide the play required when the carrier element 38 and motor 48 are rotated about axis 37.

Forming a closure for the top of housing 26 is a cylindrical gear box 63 which houses a cooperating worm 64 and worm wheel 65. The worm 64 is connected to be driven from a handwheel 66 disposed in a readily accessible position external to the gear box 63. The worm wheel 65 drives a vertical shaft 86 which operates through bevel gearing 67 to drive a sprocket wheel 68 which is rotatably carried by one of the legs 36 of housing 26. A chain belt 69 links sprocket wheel 68 with another sprocket wheel 70 which latter is fixedly attached to carrier element 38 so as to be centered about axis 37. Thus, through the drive mechanism just described, the angular position of the carrier element 38 and tool 49 about horizontal axis 37 can be manually adjusted by suitable maipulation of the operator's handwheel 66. Further, by virtue of the inclusion of the worm and worm wheel 64, 65, this drive mechanism is only unidirectionally operable, so that once the handwheel 66 has been set, the carrier element 38 and tool 49 are effectively locked in position.

Figure 3:
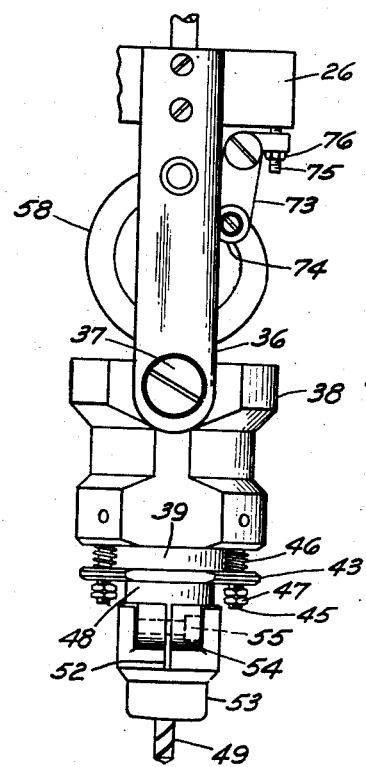
Fig. 3 is a side elevation view of the lower portion of the device, this view being taken along the lines 3—3 of Fig. 1.

As shown in Fig. 3, provision is made for adjusting and maintaining the tautness of the chain belt 69. For this purpose, a bell crank lever 73 is pivotally supported from housing 26 for rotation about a horizontal axis. An idler roller 74 is carried at the end of one leg of lever 73, the roller bearing against the chain belt 69 and urging it inwardly to thereby keep it taut. Near the end of the other leg of lever 73 is a tapped hole through which a bolt 75 is threaded and locked in position by means of nut 76. The upper end of bolt 75 bears against the bottom of housing 26, as shown. It will be apparent that the tautness of the chain belt 69 may be increased by threading bolt 75 farther along the tapped hole, thereby forcing lever 73 to rotate in a clockwise direction, and forcing the roller 74 to move inwardly and bear with greater force against the chain belt 69.

Pivotally attached to the top of housing 26 for rotation about a horizontal axis is a yoke member 77 to the top of which is attached a finger ring 78 to facilitate manual supporting and transporting of the entire device.

In the operation of the internal cutting device of the present invention, two pre-adjustments are possible. It will be apparent that by suitably adjusting the axial position of the cylindrical member 53 relative to the motor casing, the amount by which the tool 49 extends beyond the bottom surface of member 53 may be adjusted, and this will define a maximum possible depth of hole or slot which may be cut before the bottom surface of member 53 will contact and be stopped by the adjacent uncut surface of the workpiece. By adjusting the position of the nuts 47 on bolts 45, the absolute lower limit of movement of the tool 49, irrespective of depth of cut, may be adjusted.

These two pre-adjustments having been made to suit the contemplated operations, the lower portion of the cutting device is inserted in the neck of the workpiece, and the entire device is then properly aligned with respect to the workpiece by means of adjusting bolts 7, and firmly secured to the workpiece by rotation of handles 19. In these last described operations, the tool 49 will have contacted the internal surface of the workpiece and the springs 46 will have been compressed, so that the tool is being urged against the workpiece surface with some force. If the motor 48 is then energized, the tool 49 will begin to cut, and it will continue to bore deeper into the workpiece as the springs 46 expand. This process will continue until either one of the two above described pre-adjusted stop mechanisms becomes effective, that is, either until the sleeve 43 is stopped by contacting nuts 47, or until cylindrical member 53 is stopped by its bottom surface contacting the surface of the workpiece adjacent the cut.

During operation, handles 28 and handwheel 66 permit the operator to position the tool at any desired point on a spherical surface. For example, with the index bar 30 in its inner position engaging one of cups 29, so that housing 26 is locked against rotation about its vertical axis, handwheel 66 can be manipulated so as to swing the tool 49 in a vertical arc about horizontal axis 37, whereby a meridian-like groove or slot may be cut in the internal surface of the workpiece. At any desired angular position of the tool along this vertical arc, the handwheel 66 may be left stationary, bar 30 locked in its outer position, and, by means of handles 28, the entire housing 26 rotated about its vertical axis, whereby the tool 49 will be caused to cut a circular slot lying in a horizontal plane.

Thus, it will be apparent that the internal cutting device of the present invention is highly flexible in its operation, being adapted to cut a series of circular slots lying in different vertical planes, or a series of circular slots lying in different horizontal planes, or, by a combination of these operations, to remove all, or any desired portion, of the internal surface of a workpiece to a desired depth. Furthermore, by removing the device from the workpiece and making adjustments of the position of nuts 47 and/or cylindrical member 53, slots of varying depth may be cut.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An internal radius cutter comprising an upper cylindrical body portion, a first sleeve disposed about said upper body and provided with a downwardly and outwardly extending skirt portion at its lower extremity, a plurality of gripping jaws carried by said skirt, means to move said jaws transverse to said upper body, a resilient annular gasket carried by inner surface of the lower extremity of said skirt, said skirt being provided with an aperture, suction means connected to said aperture to remove cuttings therethrough, a lower body portion rigidly connected to and axially aligned with said upper portion, a cutting head journalled in said lower body portion and moveable about a transverse axis thereof, a longitudinally extending cutting tool carried by said head, means within said body portions for rotating said head about said transverse axis to a selected angle with the longitudinal axis of said body, means to rotate said upper body portion within said first sleeve to move said head aximuthally relative to said jaws, and locking means connected to said upper body portion to selectably prevent rotation thereof.

2. The device of claim 1 wherein said cutting head comprises a housing provided with opposed threaded apertures, threaded members journalled in said lower body portion and extending transversely through said housing apertures, an internally threaded flanged sleeve disposed axially within said housing, the flanged portion of said sleeve being provided with a plurality of threaded apertures, a plurality of longitudinally extending bolts carried by said housing, said bolts extending through said flange apertures and being provided with respective nuts to position said sleeve longitudinallly, respective springs disposed about said bolts between said flange and said housing to continuously urge said flange downwardly, a motor for holding said cutting tool provided with a threaded outer casing mounted coaxially within said flanged sleeve and moveable therewith, and an adjustable guard member slidably mounted on said outer casing and extending axially along said tool to determine the length of exposed cutting surface.

3. The device of claim 1 wherein said jaws are carried at one end of respective bell crank members pivotally mounted on said skirt, the opposite ends of said bell crank members being provided with respective cam followers; and wherein said means for moving said jaws comprises an externally threaded sleeve disposed concentrically about and rigidly fixed to said first sleeve, a nut carried on said externally threaded sleeve and provided with an axially tapered cam section about its periphery, axial motion of said nut along said externally threaded sleeve urging said cam follower surfaces outward and said jaws radially inward.

References Cited in the file of this patent

UNITED STATES PATENTS

| | | |
|---|---|---|
| 1,727,061 | Hicks | Sept. 3, 1929 |
| 2,357,579 | Conway | Sept. 5, 1944 |
| 2,499,842 | Armitage | Mar. 7, 1950 |
| 2,527,968 | Sherman et al. | Oct. 31, 1950 |
| 2,528,474 | Moore | Oct. 31, 1950 |
| 2,638,136 | Miller | May 12, 1953 |